United States Patent

McCartney

(10) Patent No.: US 8,636,905 B2
(45) Date of Patent: Jan. 28, 2014

(54) METHOD FOR REMOVAL OF VOLATILE PHOSPHATES FROM HYDROCARBONS

(75) Inventor: Thomas Robert McCartney, Redwood Meadows (CA)

(73) Assignee: Woodrising Resources Ltd., Calgary, Alberta (CA)

( * ) Notice: Subject to any disclaimer, the term of this patent is extended or adjusted under 35 U.S.C. 154(b) by 457 days.

(21) Appl. No.: 12/724,242

(22) Filed: Mar. 15, 2010

(65) Prior Publication Data

US 2010/0230357 A1    Sep. 16, 2010

Related U.S. Application Data

(60) Provisional application No. 61/159,907, filed on Mar. 13, 2009.

(51) Int. Cl.
*C02F 1/42* (2006.01)

(52) U.S. Cl.
USPC ............................................ 210/663; 210/906

(58) Field of Classification Search
USPC .............................................. 210/663, 906
See application file for complete search history.

(56) References Cited

U.S. PATENT DOCUMENTS

| | | | |
|---|---|---|---|
| 1,397,113 A | 11/1921 | Prutzman | |
| 1,579,326 A | 4/1926 | Kauffman | |
| 2,090,741 A | 8/1937 | Zublin | |
| 2,618,596 A | 11/1952 | Minich et al. | |
| 3,505,374 A | 4/1970 | Monroe | |
| 3,539,310 A | 11/1970 | Finkelstein et al. | |
| 3,928,404 A | * 12/1975 | Strabberger | 554/140 |
| 4,124,492 A | 11/1978 | Fung et al. | |
| 4,174,283 A | 11/1979 | Griffin, Jr. | |
| 4,200,539 A | 4/1980 | Burnham et al. | |
| 4,200,540 A | 4/1980 | Burnham | |
| 4,316,810 A | 2/1982 | Burnham | |
| 4,622,155 A | 11/1986 | Harris et al. | |
| 4,781,845 A | 11/1988 | Syrinek et al. | |
| 5,008,227 A | 4/1991 | Taylor et al. | |
| 5,151,211 A | * 9/1992 | Brooke et al. | 252/186.1 |
| 5,271,848 A | 12/1993 | Smith et al. | |
| 5,417,287 A | 5/1995 | Smith et al. | |
| 6,207,612 B1 | 3/2001 | Reid et al. | |
| 6,365,536 B1 | 4/2002 | Council et al. | |
| 6,468,417 B1 | 10/2002 | Biscardi et al. | |
| 6,489,260 B2 | 12/2002 | Hill et al. | |

(Continued)

FOREIGN PATENT DOCUMENTS

| | | |
|---|---|---|
| CA | 1071132 | 2/1980 |
| CA | 2550382 | 12/2007 |

(Continued)

OTHER PUBLICATIONS

"Volatile Phosphorus Remediation," Aug. 31, 2005, pp. 1-15, The Canadian Crude Quality Technical Assoc., Canadian Ass'n. of Petroleum Producers, Edmonton, Alberta, Canada (http://www.ccqta.com/phosphorus.asp).

*Primary Examiner* — Chester Barry
(74) *Attorney, Agent, or Firm* — Sheppard, Mullin, Richter & Hampton LLP

(57) ABSTRACT

This application relates to processes for selectively removing anionic phosphate molecules from contaminated hydrocarbon oil using the ion exchange activity of acid activated clay. The methods are particularly applicable to the removal of volatile phosphates from hydrocarbons contaminated during fracturing operations.

25 Claims, 3 Drawing Sheets

(56) References Cited

U.S. PATENT DOCUMENTS

| | | |
|---|---|---|
| 2007/0032387 A1 | 2/2007 | Delgado et al. |
| 2007/0173413 A1 | 7/2007 | Lukocs et al. |
| 2008/0223756 A1 | 9/2008 | Schurz |
| 2008/0227666 A1 * | 9/2008 | Randal et al. ............... 507/203 |
| 2010/0298587 A1 * | 11/2010 | Schurz ........................ 554/191 |
| 2012/0121772 A1 * | 5/2012 | Bijl et al. ..................... 426/253 |

FOREIGN PATENT DOCUMENTS

| | | |
|---|---|---|
| CA | 2566070 | 12/2007 |
| CA | 2610660 A1 | 5/2008 |
| WO | WO 92/18590 | * 10/1992 |

* cited by examiner

METHOD FOR REMOVAL OF VOLATILE PHOSPHATES FROM HYDROCARBONS

CROSS-REFERENCE TO EARLIER-FILED APPLICATION

This application claims priority from and incorporates by reference U.S. Provisional Patent Application Ser. No. 61/159,907, filed Mar. 13, 2009, entitled "Method for Removal of Volatile Phosphates from Hydrocarbons."

FIELD OF THE INVENTION

This application relates to processes for selectively removing anionic phosphate molecules from contaminated hydrocarbon oil using the ion exchange activity of acid activated clay. The methods are particularly applicable to the removal of phosphates from hydrocarbons contaminated during fracturing operations.

BACKGROUND OF THE INVENTION

In the production of oil from underground formations, once a well has been drilled it is often necessary to fracture the underground formation to increase the exposure the well has to the surrounding formation. In many wells, this is accomplished through the use of fracturing fluids, commonly referred to as "frac fluids", which are pumped into the well bore at a sufficient rate and pressure to increase the pressure downhole to a value in excess of the fracture gradient of the formation rock. This high pressure causes the formation to crack such that a multitude of fracture lines will extend radially from the well and thus, allow the frac fluid and any proppant to enter the fracture lines and thereby flow into the formation. Upon releasing the surface pressure, the frac fluids (without proppant) will flow back to well where they are pumped out of the well for re-processing and/or disposal.

Frac fluids are often comprised of a hydrocarbon carrier liquid together with proppants and various phosphate derivatives that act as gelling agents to assist in carrying the proppants within the induced fractures. That is, the gelling agents generally act to temporarily increase the viscosity of the frac fluid to facilitate the transport of proppants into the fractures. A well-known method for gelling hydrocarbons uses a combination of a phosphate ester backbone combined with a metal activator/cross linking agent and breaker system. Examples of these systems are described in various patents. For example, U.S. Pat. No. 4,781,845; U.S. Pat. No. 4,316,810; U.S. Pat. No. 4,174,283; U.S. Pat. No. 4,200,539; U.S. Pat. No. 4,200,540; and U.S. Pat. No. 4,622,155 describes frac fluids that use an aluminum salt and an alkyl phosphate ester. U.S. Pat. No. 3,505,374 and U.S. Pat. No. 5,417,287 describe similar systems using iron as the cross linking agent.

As noted, after frac fluids have been "broken" (i.e. the temporarily induced viscosity is relaxed) and have otherwise served their purpose to fracture the formation, they are flowed back from the well and recovered. Depending on the frac fluid system, many frac fluids will be ultimately combined with crude oil for sale to refineries. Unfortunately, these flow back fluids contain residual oil-soluble phosphate esters that, unless substantially removed from the residual oil, can lead to significant downstream issues during subsequent oil processing at a refinery. For example, when a crude oil is combined with the flow back fluid and then enters an oil refinery, it may be heated in a refinery tower to approximately 340° C., which causes ester hydrolysis and the formation of lower molecular weight phosphorus compounds that vaporize and condense in the upper stages of the tower. The phosphorus compounds in the crude oil may cause fouling in the tower by restricting flow due to the buildup of a polymeric deposit, typically composed of carbon, hydrogen, phosphorus, nitrogen, and copper/nickel. Flow restrictions decrease the efficiency of the tower and will ultimately lead to a shutdown to remove the contaminants. High levels of phosphorus compounds in the crude oil can also lead to fractionation problems as foulant accumulates in pre-flash towers, which, as above, will require periodic equipment shutdowns as high phosphorus compound levels may cause an increase in furnace Tube Metal Temperatures (TMT). As is well known, any equipment shutdowns are costly to oil refineries.

As a result of the problem of the fouling of oil refinery equipment by phosphorus derivatives, the Canadian Association of Petroleum Producers has put an upper limit specification of 0.5 ppm volatile phosphorus in crude oil, where volatile phosphorus is defined as the phosphorus found in the oil fraction removed by a single plate ASTM D86 distillation (i.e. the phosphorus concentration in the distillate fraction of crude oil collected from the initial boiling point (IBP) to 250° C.). Total phosphorous includes all phosphorous compounds that do and do not meet the above definition. Currently, the high-volatile phosphorus gellant technology commonly used in the manufacturing of frac fluids can result in volatile phosphorus values greater than 100 ppm in initial flow-back.

In general, a typical oil or gas well fracture service will use approximately 100 $m^3$ of frac fluid per fracture per well. In addition, there are trends within the industry to use substantially larger volumes of fracturing fluids as a result of the exploitation of deeper hydrocarbon reservoirs and new fracturing technologies. Under normal activity levels in Western Canada, there is an estimated total volume of flow-back fluids of 400,000 $m^3$ per year. The market in the United States is estimated at 5,000,000 $m^3$ of flow back fluids per year. As a result, due to the imposed limits on volatile phosphorus in crude oil, oil companies generally have a need for a solution to reduce volatile phosphorus in crude oil. Various solutions to reduce volatile phosphorus include using a non-phosphorus based oil gellant; using a low-volatiles phosphorus based oil gellant; using water-based fracing; and removing volatile phosphorus from frac fluid returns.

Non-Phosphorus Based Oil Gellants

A review of the prior art reveals that various non-phosphorus based oil gellants have been in existence for some time, as described in U.S. Pat. No. 3,539,310 and U.S. Pat. No. 2,618,596. However, non-phosphorus based oil gellants are generally not utilized as the breaking of non-phosphorus based oil gellants tends to be inconsistent. More specifically, it can be difficult to obtain reproducible gels under field conditions where water content and the variability of oil chemistry cause unpredictable changes in the gel properties and breaking times.

Low-Volatility Phosphorus Based Oil Gellants

A review of the prior art reveals that various low volatility phosphate ester systems have been proposed as oil gellants as described in U.S. Patent Application 2007/0032387 and U.S. Patent Application 2007/0173413. These low phosphate gelling systems still contain phosphorus that can lead to the oil having a volatile phosphorus content greater than 0.5 ppm. These systems may also have other metal ions present that cause the gellation to occur which can lead to other issues such as the need for the removal of that metal ion. Moreover, such systems will also typically have a higher cost than the high volatility phosphorus gelling technologies.

Water-Based Fracturing Fluids

Water based fracturing technology that does not involve phosphorus is currently in use in the oil industry. This method does not contribute to refinery equipment fouling based on phosphorus derivatives. However, water-based fracing is limited by the effects of water in the well as within many formations even small amounts of water can cause serious damage to the formation by causing the migration of fines or the swelling of water sensitive clays in the formation such that formation may be made unusable when it is fraced with water. As well, oil-based fracing fluids are typically easier to clean up than water-based fracing fluids in dry or non-water containing formations.

Processes for Removing Phosphorus from Fracturing Fluid Returns

There are several technologies in existence for the removal of phosphorus from frac fluid returns. For example, one such technology as stated in the Phosphorus in Crude (August 2005) document located on the Canadian Crude Quality Technical Association (CCQTA) website (http://www.ccqta.com/phosphorus.asp), entitled "Volatile Phosphorus Remediation", uses a catalytic treatment process to extract phosphorus and other contaminants from frac fluid flow back. Other references describe various chemical treatments available to remove phosphorus from frac fluid flow back. For example, U.S. Pat. No. 6,207,612 discloses a method to develop an adsorbent media comprised of alumina with minor amounts of calcia and magnesia to remove phosphate and metal contaminants from hydrocarbon oil.

However, a review of the prior art reveals that there continues to be a need for a method for the effective removal of phosphorus from frac fluid flow back and crude oil and particularly an effective method of using acid-activated clays. While the prior art shows various processes for making and utilizing acid-activated clays for bleaching vegetable oils are described in U.S. Pat. No. 1,397,113; and other uses as described in U.S. Pat. No. 1,579,326; U.S. Pat. No. 5,008,227; U.S. Pat. No. 6,365,536; U.S. Pat. No. 2,090,741; U.S. Pat. No. 6,489,260; and U.S. Application 2008/0223756, the prior art is silent with respect to the effective removal of phosphorous from fracturing fluids using clays. In addition, while U.S. Pat. No. 4,124,492 and corresponding CA Patent No. 1,071,132 teach a process for reclaiming useful hydrocarbon oils from waste oil, specifically crankcase oil and used diesel lubricating oil, using a treatment of acid activated clay at a high temperature, after the waste oil has been treated with isopropanol or N-propanol, to clarify the oil, these patents are also silent with respect to the effective removal of phosphorous from fracturing fluids using clays.

More specifically, therefore, there has been a need for the effective use of acid-activated clay for the removal of volatile phosphorus from broken frac fluids and crude oil with high volatile phosphorus content. While acid-activated clay is known as a bleaching agent and is a known method for removing coloring materials and odor causing compounds from vegetable oils, the prior art does not teach or support a process for utilizing such clays with petroleum oils and specifically, petroleum oils that have been contaminated with phosphorus from frac fluid flow back.

SUMMARY OF THE INVENTION

In accordance with the invention, there is provided a process for treating a hydrocarbon oil contaminated with phosphorus contaminants, comprising the steps of: a) adding acid activated clay to the hydrocarbon oil to create a hydrocarbon oil and clay slurry; b) mixing the hydrocarbon oil and clay slurry; and c) separating the hydrocarbon oil and clay slurry to form a separated clay containing phosphorus compounds contaminants and a hydrocarbon oil component wherein the hydrocarbon oil component is substantially free of the phosphorus compounds.

In a further embodiment, the mixing and separation steps are repeated using fresh or re-cycled acid activated clay.

The process may be affected by various parameters including the reaction time (ideally step b) is performed for a time sufficient to effect greater than 99% (by weight) phosphorous decontamination after step c) or to reduce the phosphorous decontamination to less than 0.5 ppm), by the particle size (preferably 10-250 μm and more preferably 10-50 μm), available surface area and/or concentration of the acid activated clay (1-5% by weight and more preferably 2-3% by weight), by the degree of acid activation as well as the temperature of the reaction.

In various embodiments, it is preferred that the acid activated clay is any one of or a combination of montmorilinite, bentonite and attapulgite clay.

In another embodiment, the invention provides a process for treating a recovered fracturing fluid, the fracturing fluid comprising hydrocarbon oil contaminated with phosphorus from the fracturing process, comprising the steps of: a) dewatering the recovered fracturing fluid; b) mixing the recovered fracturing fluid from step a) with acid activated clay; and c) separating the recovered fracturing fluid from step b) to form a separated clay containing phosphorus compounds and a hydrocarbon oil component wherein the hydrocarbon oil component is substantially free of the phosphorus compounds.

BRIEF DESCRIPTION OF THE DRAWINGS

The invention is described with reference to the accompanying figures in which.

DETAILED DESCRIPTION OF THE INVENTION

Overview

With reference to the figures, processes for removing total and volatile phosphorus from petroleum and particularly recovered fracturing fluids using acid activated clay are described.

In accordance with this invention, a method for the effective removal of volatile phosphorus is described in which contaminated oil containing volatile phosphorus is treated with acid activated clay, which is generally made from bentonite or attapulgite clay. The activated clay is made by reacting a strong mineral acid, such as hydrochloric or sulphuric acid, with a clay so as to replace the exchangeable cations (i.e. calcium, sodium, magnesium) in the clay with hydrogen ions. This reaction causes a change to the crystal structure of the clay particle and ultimately the capacity of the clay to react with cations, as well as the surface area of the clay particles.

Each grade of acid activated clay may have a range of properties based on factors such as the reaction of the acid with the clay, the reaction temperature, contact time, and subsequent processing to dry the clay into a useable form.

When the acid-activated clay comes into contact with a phosphorus-containing crude oil, the active aluminum ions in the acid activated clay form a bond with the phosphate esters in the crude oil. Two sets of reactions can occur:

$$xH^+Clay^- + \text{Metal Ion}^{(x+)} = xH^+ + \text{Metal ion}^{(x+)}Clay^-; \text{ and} \quad \quad 22.1.1$$

$$RPO_4H \text{ (phosphate ester)} + H^+Clay^- = RPO_4HClay^- + H. \quad 22.1.2$$

In the first reaction, the metal ions in the oil, such as $Fe^{3+}$ or $Cu^{2+}$, occupy the exchangeable cation layer in the clay, replacing the hydrogen ions. In the second reaction, the phosphate compound in the oil reacts with the exposed aluminum atoms in the clay structure to form a complex that is similar to the complex formed when the frac fluid originally gelled.

Figure 1:
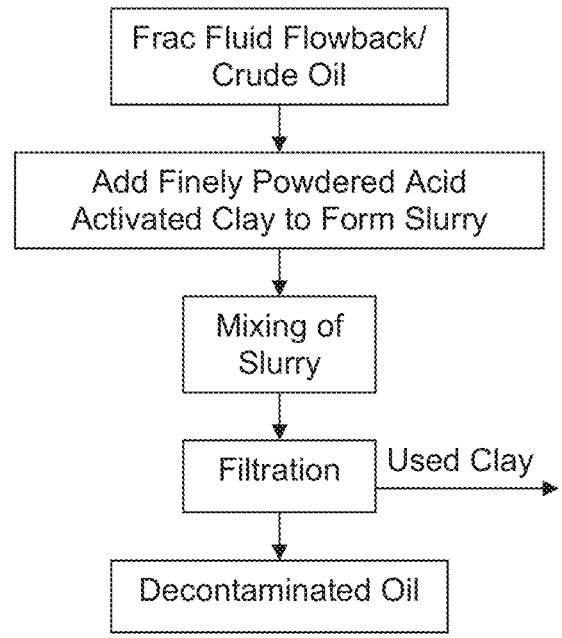
FIG. 1 is a flowchart showing the general methodology of one embodiment of the process of removing volatile phosphorus from petroleum using finely powdered acid activated clay.

In this invention, there are generally two different methods for treating the hydrocarbon oil with acid activated clay. In the first embodiment shown in FIG. 1, the acid activated clay is utilized in the form of a powder material with a high surface area. In this embodiment, the powdered clay is added to the oil in concentrations of about 1-5% by weight to form a slurry which is continuously agitated to ensure contact between the clay powder and oil for a period of 1-24 hours. After an appropriate contact time has elapsed, the slurry mixture is separated, removing the solid particles containing the phosphorus compounds and some of the multivalent metal ions, leaving a liquid that is generally free of phosphorus. Any appropriate method to ensure the complete removal of the solids from the liquid can be employed, such as settling, filtration, or centrifugation as known to those skilled in the art.

Figure 2:
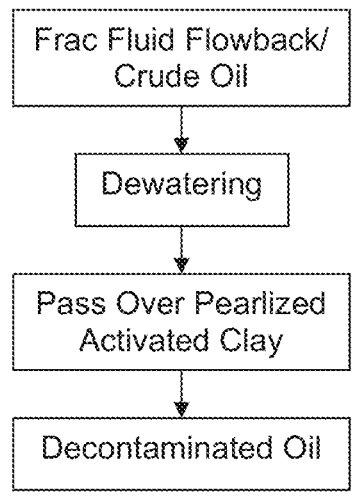
FIG. 2 is a flowchart showing a second embodiment of the process of removing volatile phosphorus from petroleum using pearlized acid activated clay.

In the second embodiment, as shown in FIG. 2, the hydrocarbon oil containing volatile phosphorus is de-watered in accordance with known de-watering techniques. The oil is then passed over a pearlized acid activated clay within a tower or packed filter containing beads of acid activated clay. As the oil passes over the beads of acid activated clay, the phosphorus compounds and some of the multivalent metal ions are removed from the oil through the two reactions stated above. The oil exits the tower or packed filter of pearlized acid activated clay in a clean condition and requires no further separation.

In both embodiments of the process, the required contact time between the oil and acid-activated clay is variable and will be determined based on the initial concentration of phosphorus in the oil, the degree of activation of the clay, the temperature the reaction occurs at, and the desired degree of phosphorus removal from the oil. The reaction temperature is variable and dependent on the properties of the oil, including amount of breaker present, pH, specific gravity, and viscosity. The methods of this invention are further described by the following laboratory and field examples.

Example 1

This example describes phosphorus removal of laboratory broken fracturing oil with fine-powdered and coarse acid activated clay.

Two acid activated clays, Refoil Optimum-33 and RO-365, both manufactured by Bleaching Earth of Baroda Earth Pvt. Ltd., were used as outlined in the first embodiment of this invention for removing phosphorus from hydrocarbon oil. As shown in Table 1, the Optimum-33 clay was finer and had a greater surface area than the coarse RO-365 clay as shown by the particle size distribution.

TABLE 1

Characteristics of Acid Activated Clays

| Property | Optimum-33 (fine) | RO-365 (coarse) |
|---|---|---|
| Bulk Density (g/l) | 543 | 650 |
| Free Moisture (%) | 6 | 6 |
| Free Acidity (%) | 0.28 | 0.60 |
| Particle Size (% μm) | | |
| <45 | 58.8 | 0 |
| 45-75 | 21.2 | 0 |
| 75-106 | 10.3 | 0 |
| 106-150 | 6.1 | 0 |
| <250 | 100 | 5 |
| 250-600 | 0 | 75 |
| 600-900 | 0 | 20 |
| >900 | 0 | 5 |

Two types of HP8 frac oils were used in this experiment: SF-800™, manufactured by SynOil™ Fluids, and Berland 150, distributed by DC-Energy Services Inc. The frac oils were gelled by Trican™ using the Trican HP8 Gellant system, and the total phosphorus content and volatile phosphorus fraction of each gelled frac oil was measured. As shown in Table 2, the initial phosphorus and volatile phosphorus content of the Berland 150 frac oil is higher than the phosphorus and volatile phosphorus content of the SF-80™ frac oil.

TABLE 2

Concentrations of Total Phosphorus and Volatile Phosphorus in Laboratory Broken Frac Fluids Before Treatment and After Treatment With Fine and Coarse Acid Activated Clays

| | Total Phosphorus (ppm) | | | Volatile Phosphorus (ppm) | | |
|---|---|---|---|---|---|---|
| Broken Frac Fluid | Untreated | Treated Coarse RO-365 | Treated Fine O-33 | Un-treated | Treated Coarse RO-365 | Treated Fine O-33 |
| SF-800 ™ | 294 | 104 | 37.2 | 17.4 | 3.93 | 0.36 |
| Berland 150 | 722 | 606 | — | 54.8 | 51.8 | — |

In accordance with the first embodiment of the invention, a 300 mL sample of each type of gelled frac oil were each treated With the fine acid activated clay, and another 300 mL sample of each gelled frac oil was treated with the coarse acid activated clay. The clay was added to the frac oil to create a slurry that was continuously stirred for one hour at room temperature using a magnetic stirrer. After one hour, the treated frac oil was separated from the clay by vacuum filtration, upon which the filtrate was analyzed for total phosphorus content using an inductively coupled plasma (ICP) spectrometer. The filtrate was then distilled using the ASTM D86 method and the volatile fraction of phosphorus was analyzed by ICP spectrometry. The results of these analyses are shown in Table 2. Table 3 shows the removal efficiency of each type of acid-activated clay for both samples of frac oil. Note the Berland 150 frac oil sample treated with the fine clay was not filtered due to the re-gelling of the frac oil sample from the acidic pH of the clay. This issue was overcome in subsequent experiments by heating the treated frac oil prior to filtration.

TABLE 3

Removal Efficiency of Total Phosphorus and Volatile
Phosphorus From Laboratory Broken Frac Fluids When
Treated With Coarse and Fine Acid Activated Clays

| | Removal Efficiency (%) | | | |
|---|---|---|---|---|
| Broken | Total Phosphorus | | Volatile Phosphorus | |
| Frac Fluid | Treated Coarse | Treated Fine | Treated Coarse | Treated Fine |
| SF-800 ™ | 64.63 | 87.35 | 77.41 | 90.84 |
| Berland 150 | 16.07 | — | 5.47 | — |

As shown in Table 2 and Table 3, the treatment of the two frac oils with acid-activated clay reduced both the total phosphorus and volatile phosphorus content of both the frac oils. Treatment of the SF-800™ frac oil with the fine-powdered clay was more effective for removing phosphorus and volatile phosphorus from the frac oil than treatment with the coarse clay. The removal efficiency of phosphorus and volatile phosphorus using a coarse clay was greater for the SF-800™ frac oil than the Berland 150 frac oil, with the SF-800™ frac oil having a lower initial phosphorus and volatile phosphorus content.

Example 2

This example shows the effect of double treatment of laboratory broken frac fluid with fine powdered acid activated clay.

The two previously described laboratory broken frac oils, SF-800™ and Berland 150, were treated with a bentonite-based and an attapulgite-based acid activated clay, with the characteristics of the clays described in Table 4 below. As shown, the main difference between the two clays was the base clay from which they were manufactured.

TABLE 4

Characteristics of Acid Activated Clays

| Clay | Manufacturer | Base Clay | Particle Size (% <74 μm) | Acidity (%) |
|---|---|---|---|---|
| Grade F-110 | BASF-Engelhard Corporation | Bentonite | 88 | 0.55 |
| Optimum-33 | Bleaching Earth of Baroda Earth Pvt. Ltd. | Attapulgite | 91 | 0.28 |

A 600 mL sample of Berland 150 frac oil was mixed with the bentonite clay and another 600 mL sample of Berland 150 frac oil was mixed with the attapulgite clay, both at a ratio of 3 g of clay per 100 mL of oil, to create a slurry that was continually mixed for one hour using a magnetic stirrer. As both the samples re-gelled after a few minutes of mixing due to the acid activated clay lowering the pH of the oil, the samples were heated to 60-70° C. at the end of the hour to lower their viscosity. Each sample was then vacuum filtered and the filtrate of each was re-mixed with a clean batch of the same type and amount of acid activated clay to form a second slurry. The slurry was continuously stirred for one hour, and as the samples did not re-gel, no heating was required before the samples were vacuum filtered.

Using the same process as described above, a 600 mL sample of SF-800™ broken frac oil was mixed with the bentonite clay, and another 600 mL sample of SF-800™ was mixed with the attapulgite clay. Each slurry was continuously stirred for one hour, vacuum filtered, the filtrate re-mixed with a clean batch of bentonite or attapulgite clay, and vacuum filtered once again. No heating was required for the SF-800™ oil as re-gelling did not occur upon mixing the oil with the acid activated clay.

Before treatment and after the double treatment with acid-activated clay, the total phosphorus content and the volatile phosphorus content of each sample of frac oil was measured using an ICP spectrometer by the accepted standard analysis method, as shown in Table 5. The accepted detection limit for total phosphorus was 0.5 ppm, though volatile phosphorus as low as 0.2 ppm could be detected in a sample. Table 6 outlines the removal efficiency of phosphorus and volatile phosphorus from the samples of frac oil with bentonite and attapulgite acid activated clays. Prior to treatment, the Berland 150 frac oil was an opaque black color, and after treatment with the bentonite clay it was a translucent golden color. The SF-800™ frac oil was a translucent red color before treatment and translucent and clear after treatment with the bentonite clay.

TABLE 5

Concentrations of Total Phosphorus and Volatile Phosphorus in
Laboratory Broken Frac Fluids Before Treatment and After Second Treatment with
an Acid Activated Clay

| | Total Phosphorus (ppm) | | | Volatile Phosphorus (ppm) | | |
|---|---|---|---|---|---|---|
| Broken Fracturing Oil | Untreated | Treated Attapulgite (F-110) | Treated Bentonite (Optimum-33) | Untreated | Treated Attapulgite (F-110) | Treated Bentonite (Optimum-33) |
| SF-800 ™ | 294 | <0.5 | <0.5 | 17.4 | 0.45 | 0.45 |
| Berland 150 | 722 | <0.5 | <0.5 | 54.8 | 0.63 | — |

TABLE 6

Removal Efficiency of Volatile Phosphorus and
Total Phosphorus from Laboratory Broken Frac
Fluids Treated with Acid Activated Clays

| Oil Sample | Clay Treatment | Removal Efficiency Volatile Phosphorus (%) | Removal Efficiency Total Phosphorus (%) |
|---|---|---|---|
| SF-800 ™ | Attapulgite (F-110) | 97.41 | 99.83 |
| SF-800 ™ | Bentonite (Optimum-33) | 97.41 | 99.83 |
| Berland 150 | Attapulgite (F-110) | 98.85 | 99.93 |
| Berland 150 | Bentonite (Optimum-33) | 97.59 | 99.83 |

As shown in Table 5 and Table 6, the double treatment of frac oil with attapulgite or bentonite acid-activated clay reduced the total phosphorus and volatile phosphorus content of the oil to close to the detection limit. Within the margin of error of the measurements, the double treatment removed essentially 100% of the available phosphorus from all the samples.

Example 3

This example shows the effect of treatment of recovered field samples of broken frac fluid with acid-activated clay.

Random field samples of recovered broken fracturing fluids with gelled hydrocarbons and high volatile phosphorus content from five different oil wells were treated with the bentonite-based Optimum-33 acid activated clay. Three grams of clay per 100 mL of fracturing fluid was added to the fracturing fluid to make a slurry and the slurry was continually mixed for one hour at room temperature (17-20° C.) then vacuum filtered. The filtrate was treated with a clean batch of Optimum-33 clay using the same method as the previously described treatment. Prior to treatment, after one treatment with clay, and after two treatments with clay, the total phosphorus and volatile phosphorus content of each sample was measured using ICP Spectroscopy, as shown in Table 7. In Table 7, the subscript 0 sample is the untreated sample, the subscript 1 sample is after the primary treatment, and the subscript 2 sample is after the second treatment with acid activated clay.

TABLE 7

Total Organic Phosphorus Concentration, Volatile Phosphorus Concentration, and the Reduction in Volatile and Total Phosphorus in Frac Fluid Flow Back Samples Before Treatment, After One Treatment, and After Two Treatments with Acid Activated Clay

| Value | $A_0$ | $A_1$ | $A_2$ | $B_0$ | $B_1$ | $B_2$ | $C_0$ | $C_1$ | $C_2$ | $D_0$ | $D_1$ | $D_2$ | $E_0$ | $E_1$ | $E_2$ |
|---|---|---|---|---|---|---|---|---|---|---|---|---|---|---|---|
| Total P (ppm) | 65.3 | 3.2 | 0 | 70.6 | 3.5 | 0 | 114 | 2.0 | 0 | 125 | 4.2 | 0 | 123 | 1.9 | 0.5 |
| Reduction in Total P (%) | — | 95 | 100 | — | 95 | 100 | — | 98 | 100 | — | 97 | 100 | — | 98 | 100 |
| Volatile P (ppm) | 10.6 | 1.35 | 0.25 | 13.1 | 1.54 | 0.41 | 10.3 | 1.35 | 0.28 | 14.0 | 0.46 | 0.46 | 7.3 | 1.1 | 0.45 |
| Reduction in Volatile P (%) | — | 87 | 98 | — | 88 | 97 | — | 87 | 97 | — | 97 | 97 | — | 85 | 94 |

As shown in Table 7, there was 100% reduction in total phosphorus content (within the detection limits) and 94-98% reduction in volatile phosphorus content of each fracturing fluid flow back sample after two subsequent treatments with acid activated clay. The volatile phosphorus content was lowered to <0.46 ppm for each sample of fracturing fluid flow back, which is below the upper limit of 0.5 ppm as set by the Canadian Association of Petroleum Producers for volatile phosphorus in crude oil.

For three of the samples, a total metal scan was performed for the untreated samples, the samples after one treatment with clay, and the samples after two treatments with clay, as shown in Table 8.

TABLE 8

Concentration of Various Metals in Frac Fluid Flow Back Samples

Concentration of Metal in Frac Fluid Samples (ppm)

| Metal | $C_0$ | $C_1$ | $C_2$ | $D_0$ | $D_1$ | $D_2$ | $E_0$ | $E_1$ | $E_2$ |
|---|---|---|---|---|---|---|---|---|---|
| Al | 3.8 | 25.1 | 38.5 | 2.6 | 46.2 | 0.0 | 0.4 | 0.0 | 0.0 |
| B | 0.2 | 0.5 | 0.4 | 0.1 | 0.2 | 0.2 | 0.0 | 0.0 | 0.1 |
| Ba | 0.1 | 0.1 | 0.1 | 0.1 | 0.0 | 0.1 | 0.6 | 0.1 | 0.1 |
| Ca | 1.1 | 0.1 | 0.0 | 3.0 | 0.1 | 0.1 | 0.8 | 0.0 | 0.0 |
| Cd | 0.1 | 0.1 | 0.1 | 0.1 | 0.1 | 0.1 | 0.1 | 0.0 | 0.0 |
| Cr | 0.2 | 0.0 | 0.0 | 0.4 | 0.0 | 0.0 | 0.0 | 0.0 | 0.0 |
| Cu | 0.1 | 0.1 | 0.1 | 160.0 | 0.1 | 0.0 | 0.2 | 0.0 | 0.0 |
| Fe | 115.0 | 0.0 | 0.0 | 8.7 | 0.0 | 0.0 | 1.1 | 0.0 | 0.0 |
| Mg | 6.9 | 0.3 | — | 0.4 | | | 0.4 | | |
| Mn | 0.5 | 0.1 | 0.1 | 0.0 | 0.1 | 0.1 | 0.1 | 0.0 | 0.0 |
| Mo | 0.0 | 0.1 | 0.0 | 2.5 | 0.1 | 0.1 | 0.0 | 0.1 | 0.1 |
| Na | — | — | — | 0.0 | — | — | 6.6 | — | — |
| P | 114.0 | 0.0 | 0.0 | 122.0 | 2.2 | 0.0 | 0.1 | 0.0 | 0.0 |
| vP | 21.3 | 0.0 | 0.3 | 17.6 | 0.2 | 0.1 | 55.7 | 0.3 | 0.3 |
| Pb | 0.1 | 0.1 | 0.1 | 0.9 | 0.1 | 3.4 | 10.1 | 0.0 | 0.0 |
| S | — | 23.5 | 24.0 | — | 45.2 | 0.0 | — | 0.0 | 0.0 |
| Si | 0.7 | 0.0 | 0.0 | 0.4 | 0.0 | 0.0 | 0.0 | 0.0 | 0.0 |
| Sn | 0.0 | 0.0 | 0.0 | 0.0 | 0.0 | 0.1 | 0.0 | 0.0 | 0.1 |
| Ti | 0.5 | 0.0 | 0.0 | 0.6 | 0.1 | 0.0 | 0.0 | 0.0 | 0.0 |
| V | 0.2 | 0.0 | 0.0 | 0.3 | 0.0 | 0.0 | 0.3 | 0.0 | 0.0 |
| Zn | 0.2 | 0.0 | 0.0 | 1.0 | 0.0 | 0.0 | 0.0 | 0.0 | 0.0 |

As shown in Table 8, the metal analysis reveals that the acid activated clay removes phosphorus and volatile phosphorus (vP) as well as several metals when they are present in the fracturing fluid flow back, including calcium, chromium, copper, iron, silicon, titanium, vanadium, and zinc.

TABLE 9

Color and Transparency of Fracturing Fluid Flow Back Samples Before and After Treatment with Acid Activated Clay

| Sample | Color of Sample | Transparency of Sample |
|---|---|---|
| $A_0$ | Dark Brown | Opaque |
| $A_1$ | Yellow | Clear |
| $A_2$ | Light Yellow | Clear |
| $B_0$ | Dark Brown | Opaque |
| $B_1$ | Light Orange | Clear |
| $B_2$ | Yellow | Clear |
| $C_0$ | Black | Opaque |
| $C_1$ | Orange | Clear |
| $C_2$ | Yellow | Clear |
| $D_0$ | Dark Brown | Cloudy |
| $D_1$ | Orange | Clear |
| $D_2$ | Yellow | Clear |
| $E_0$ | Brown | Cloudy |
| $E_1$ | Yellow | Clear |
| $E_2$ | Light Yellow | Clear |

As shown in Table 9, after treatment with acid activated clay, each fracturing fluid flow back sample went from a dark opaque or cloudy color to a clear yellow or orange color after one treatment, and an even lighter clear yellow liquid after two treatments with acid activated clay, indicating the removal of phosphorus and metals.

Example 4

This example shows the effect of treatment of a recovered field sample of broken frac fluid with various concentrations of acid-activated clay and a varying contact time.

In this example, a field sample of broken frac oil was divided into 300 mL samples that were treated with a fine powdered bentonite acid-activated clay (Optimum-33) at 17° C. to make a slurry that was continually stirred for a given period of time and then vacuum filtered to remove the solids. The total phosphorus content and volatile phosphorus content of each frac oil sample before and after treatment with the clay was measured using ICP spectroscopy.

As shown in Table 10, in the first part of this experiment, the time of contact between the frac oil and acid activated clay was kept constant at one hour while the ratio of clay to frac oil was varied.

TABLE 10

Total Phosphorus Content, Volatile Phosphorus Content, and The Percent Removed Of Both Total And Volatile Phosphorus From Recovered Frac Oil After Treatment With Various Concentrations Of Acid-Activated Clay

| Ratio of Clay to Frac Oil (g/100 mL) | Total Phosphorus (ppm) | Volatile Phosphorus (ppm) | Total Phosphorus Removed (%) | Volatile Phosphorus Removed (%) |
|---|---|---|---|---|
| 0.00 | 73.0 | 0.43 | 0 | 0 |
| 0.75 | 26.6 | 2.24 | 64 | 79 |
| 1.50 | 10.9 | 0.80 | 85 | 92 |
| 3.00 | 3.24 | 0.75 | 96 | 93 |

As shown in Table 10, the amount of phosphorus and volatile phosphorus removed from the frac oil increased as the ratio of clay to frac oil increased. However, when the ratio of clay to frac oil increased from 1.50 g/100 mL to 3.00 g/100 mL, there was only a slight increase in the amount of volatile phosphorus removed from the frac oil.

As shown in Table 11, in the second part of this experiment, the time of contact between the frac oil and acid activated clay was varied as well as the ratio of clay to frac oil. These results showed that a longer treatment time of 3 hours with a lesser concentration of 2 g/100 mL clay to frac oil was as effective at removing all the phosphorus in the frac oil as the double treatment of one hour each with 3 g/100 mL clay to frac oil as shown in Example 3. As the concentration of clay decreased further from 2 g/100 mL and the contact time increased from 3 hours, the removal of phosphorus is only partially complete.

TABLE 11

Comparison of Clay to Frac Oil concentration and Reaction Time

| Ratio of Clay to Frac Oil (g/100 mL) | Time of Contact (hrs) | Total Phosphorus (ppm) | Volatile Phosphorus (ppm) | Total Phosphorus Removed (%) | Volatile Phosphorus Removed (%) |
|---|---|---|---|---|---|
| 0.0 | 0 | 73.0 | 10.43 | 0 | 0 |
| 2.0 | 2 | 2.43 | 0 | 97 | 100 |
| 2.0 | 3 | 0 | 0 | 100 | 100 |
| 2.0 | 4 | 0 | 0 | 100 | 100 |
| 1.5 | 6 | 3.01 | 0.60 | 96 | 94 |
| 1.0 | 6 | 13.4 | 1.52 | 82 | 85 |
| 0.5 | 6 | 46.7 | 6.27 | 36 | 40 |

Re-Use Test

The solids from a previous test were collected by filtering and reused at the same rate as they were previously but applied in fresh oil. The results were analyzed as previously for total and volatile phosphorus as shown in Table 12. The results show that the capability of the clay to remove phosphorus with successive washes decreased over 2 cycles from 100% removal of volatile phosphorus with a first wash to 72% with a subsequent wash. Note that the concentration of clay in oil in subsequent washes was lower because of losses from the filtration process.

TABLE 12

Laboratory Re-Use Test

| Clay (g/100 ml) | Time (hrs) | Total P (ppm) | Volatile P (ppm) | % total Removed | % volatile Removed |
|---|---|---|---|---|---|
| 0 | 0 | 73 | 10.43 | 0% | 0% |
| 2 | 4 | 4.41 | 0 | 94% | 100% |
| 1.5 | 4 | 30.3 | 2.95 | 58% | 72% |

Bulk Field Trials

A field trial was conducted utilizing recovered frac fluid that had been stored in a 53 m$^3$ tank. The total initial volatile phosphorus concentration measured within the recovered frac fluid was measured as 23 ppm and the total phosphorus concentration was 180 ppm.

Figure 3:
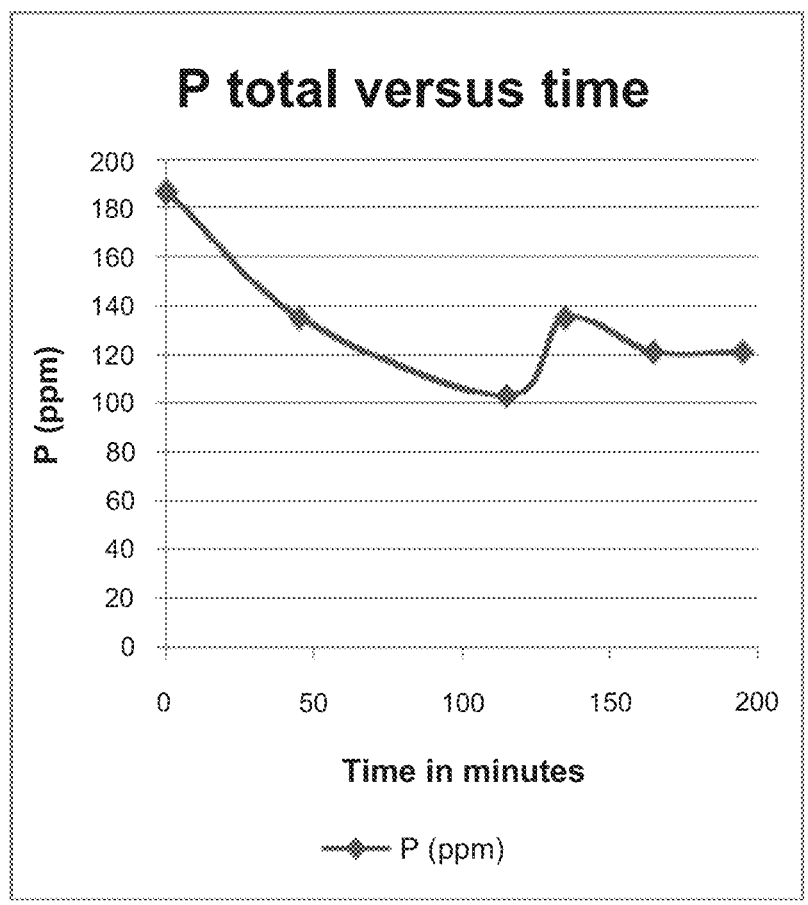
FIG. 3 is a graph showing Total Phosphorous Removal vs. Time for a field trial in accordance with one embodiment of the invention; and, FIG. 4 is a graph showing Removal Efficiency of Different Clays over multiple incubation cycles.
Figure 4:
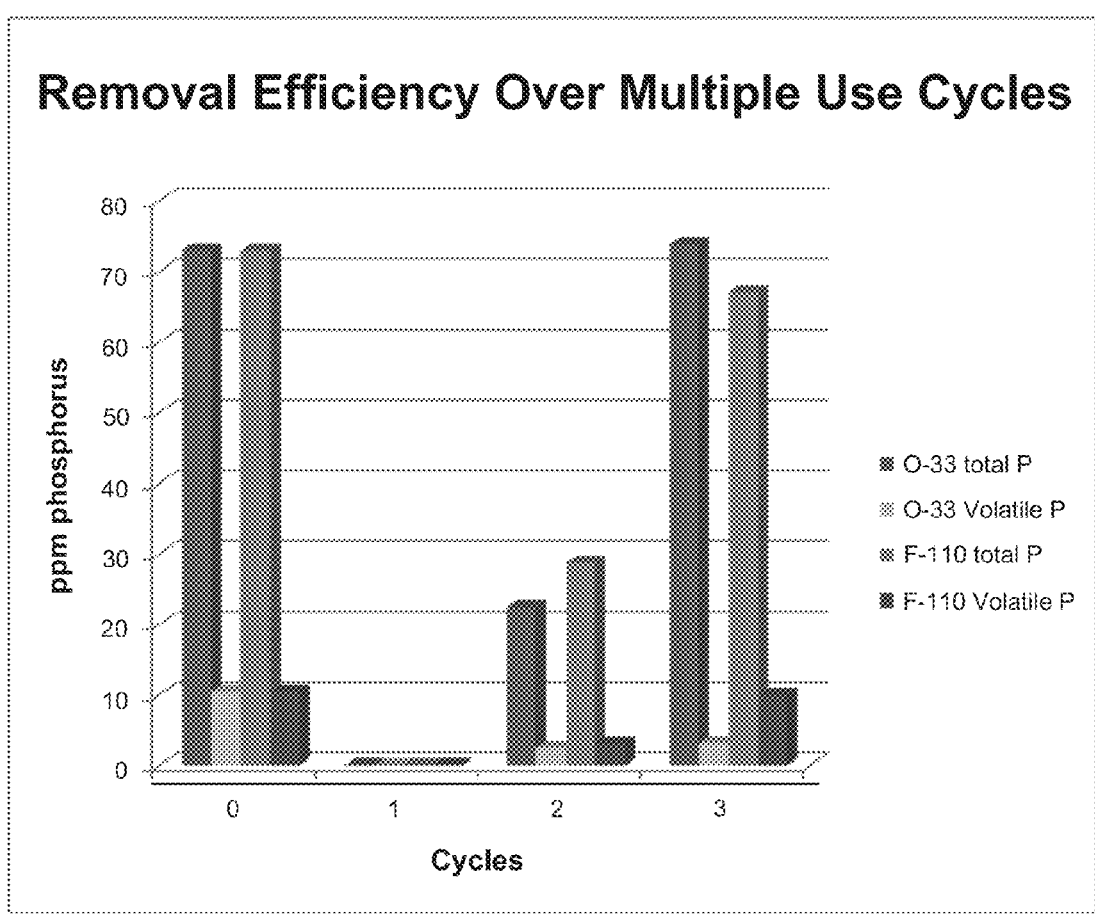

Acid Activated clay (BASF F110) was introduced into the tank through a top hatch and continuously agitated using air to effect mixing and circulation of the clay within the tank. Samples from the tank were taken every 30-45 minutes. The samples were centrifuged to remove solids and water and the samples were analyzed by various methods for total and volatile phosphorus. As shown in Table 13 and FIG. 3, the analysis showed a general decrease in total and volatile phosphorus over time.

TABLE 13

Field Trial Total and Volatile Phosphorus at Time

| Contact time (Min) | Total P (ppm) (Test 1) | Total P (ppm) (Test 2) | Volatile P (Test 3) |
|---|---|---|---|
| 0 | 320 | 187 | 36.7 |
| 45 | 346 | 135 | 32.3 |
| 115 | 354 | 103 | 27.1 |
| 135 | 340 | 135 | 32 |
| 165 | 347 | 121 | 32.3 |
| 195 | 301 | 121 | 25.7 |

A further test of the 195 minute sample with an additional 2 g/100 ml of F110 clay caused the solution to gel. This observation indicated that it is important that a balance between the total amount of clay added to the sample and the mixing velocity must be maintained at a level that does not adversely affect the ability of the reaction to proceed. That is, the viscosity of the solution must not be too high to impede mixing and hence affect extraction of phosphorous compounds.

Field Reusability Test 200 ml samples of the bulk flow back fluid were also treated with 4 grams of acid activated clay (2 g of clay/100 ml) to compare the effectiveness of different clay products including Refoil Optimum 33 (O-33) and BASF F110 in successive washings. As shown in Table 14, the fluid samples were incubated with O-33 or F110 clay for 4 hours each, filtered to collect the filtrate for analysis of total and volatile phosphorus wherein the filtered solids were re-used with fresh or untreated flow back fluid.

TABLE 14

Comparison of O-33 and F110 Clays in Successive Treatments of Bulk Fluid in Removing Total and Volatile Phosphorous Re-Use Test

| Clay (g/100 ml of oil) | Clay | cycles | Time (hrs) | Total P (ppm) | Volatile P (ppm) | % total Removed | % volatile Removed |
|---|---|---|---|---|---|---|---|
| 0 |  | 0 | 0 | 73 | 10.43 | 0% | 0% |
| 2 | O-33 | 1 | 4 | 0 | 0 | 100% | 100% |
| 2 | O-33 | 2 | 4 | 22.4 | 2.47 | 69% | 76% |
| 2 | O-33 | 3 | 4 | 73.9 | 3.12 | 0% | 70% |
| 2 | F110 | 1 | 4 | 0 | 0 | 100% | 100% |
| 2 | F110 | 2 | 4 | 28.7 | 3.12 | 61% | 70% |
| 2 | F110 | 3 | 4 | 67 | 9.89 | 8% | 5% |

As shown, the capacity of the two clays is different over successive treatments. O-33 can absorb approximately 6.2 mg of phosphorous per gram of clay and the F110 only 5.8 mg of phosphorous per gram of clay after 3 treatments.

In other words, after 3 treatments, the O-33 remained effective in removing 70% of volatile phosphorous whereas the F110 could only remove 5% volatile phosphorous.

Capacity Confirmation Test

Two sets of tests were run with a low concentration of clay. In the first test, 1 gram of F110 clay per 100 ml of oil was prepared and stirred for 3 hours. The clay was filtered and the phosphorus measured. The once-treated oil was then re-treated with fresh clay at a concentration of 1 g per 100 ml for 3 and 4 hours respectively. As shown in Table 15, at a relatively low concentration of F110 clay (1 g/100 ml), a high level of total phosphorus and volatile phosphorous removal was achieved with a total incubation time of 7 hours (3 mg/g of clay in 7 hours).

TABLE 15

Phosphorous Removal with Low Clay Concentration and 3 hour Incubation

| [Clay] (g/100 ml oil) | Clay | cycles | Time (hrs) | Total P (ppm) | Volatile P (ppm) | % total Removed | % volatile Removed |
|---|---|---|---|---|---|---|---|
| 0 | None | 0 | 0 | 73 | 10.43 | 0% | 0% |
| 1 | F110 | 1 | 3 | 42 | 5.15 | 42.5% | 50.6% |
| 1 | F110 | 2 | 4 | 5.5 | 0 | 92.5% | 100.0% |

In the second case, 1 g of O33 clay/100 ml of oil was incubated for 24 hours. After 24 hours, the clay was filtered and the total and volatile phosphorus was measured. The once-treated oil was then re-incubated with fresh clay at a concentration of 1 g of clay/100 ml of oil for another 24 hours, filtered from the oil and the total and volatile phosphorous measured. As shown in Table 16, the O33 day was effective in removing 5 mg phosphorous/g of day.

TABLE 16

Phosphorous Removal with Low Clay Concentration and 24 Hour Incubation

| [Clay] (g/100 of oil) | Clay | cycles | Time (hrs) | Total P | Volatile P | % total Removed | % volatile Removed |
|---|---|---|---|---|---|---|---|
| 0 | None | 0 | 0 | 73 | 10.43 | 0% | 0% |
| 1 | O33 | 1 | 24 | 21.3 | 0.95 | 70.8% | 90.9% |
| 1 | O33 | 2 | 24 | 0 | 0 | 100.0% | 100.0% |

In comparing the results from Tables 15 and 16, the amount of volatile phosphorous removed in the 24 hour test was higher than the amounts removed in the equivalent 3 and 4 hour tests previously run. Thus, a single 24 hour treatment was effective in reducing the volatile phosphorous values into an acceptable range.

Oil-Dri Acid Activated Agents

The effect of two oil acid activated agents was also investigated. Oil-Dri-Select 350™ is a magnesium aluminum silicate based product and Perform 6000™ is a hormite and smectite based product. As shown in Table 17, these agents were incubated with field oil samples at the concentrations and for the times shown, and despite an expectation that they would be effective in phosphorous removal were shown as not effective.

TABLE 17

Effect of Oil-Acid Activated Agents on Phosphorous Removal

| [Clay] (g/100 ml) | Clay | cycles | Time (hrs) | Total P | Volatile P | % total Removed | % volatile Removed |
|---|---|---|---|---|---|---|---|
| 0 | None | 0 | 0 | 73 | 10.43 | 0% | 0% |
| 2 | P6000 | 1 | 3 | 60.7 | 8.98 | 16.8% | 13.9% |
| 2 | S350 | 1 | 3 | 61.8 | 8.14 | 15.3% | 22.0% |
| 3 | P6000 | 1 | 3 | 46 | 4.95 | 37.0% | 52.5% |
| 3 | S350 | 1 | 3 | 38.8 | 3.91 | 46.8% | 62.5% |

CONCLUSIONS

The use of acid-activated clays are effective in removing total phosphorous and volatile phosphorous from fracturing fluids. Treatments may include multiple incubation steps at shorter incubation times, or single incubation steps for longer periods of time. The concentration of clay within the samples may be varied depending on the clay removal capacity of the specific clay. Particle size can also be varied to effect improved separation. Attapulgite or bentonite acid-activated clays are particularly effective. The process is also effective in removing metals and improving the optical clarity of oils.

The invention claimed is:

1. A process for treating a hydrocarbon oil contaminated with volatile phosphorus contaminants, comprising the steps of:
   a) adding an acid activated clay to the hydrocarbon oil to create a hydrocarbon oil and clay slurry;
   b) mixing the hydrocarbon oil and clay slurry for a time sufficient to effect volatile phosphorus removal from the hydrocarbon oil;
   c) separating the hydrocarbon oil and clay slurry to form a separated clay containing phosphorus compounds and a hydrocarbon oil component wherein the hydrocarbon oil component is substantially free of the volatile phosphorus contaminants and wherein the separation of volatile phosphorus contaminants from the hydrocarbon oil occurs within a hydrocarbon phase;
   d) adding an acid activated clay to the hydrocarbon oil component from step c) to create a second hydrocarbon oil and clay slurry;
   e) mixing the second hydrocarbon oil and clay slurry; and
   f) separating the second hydrocarbon oil and clay slurry to form a second separated clay containing phosphorus compounds and a second hydrocarbon oil component wherein the second hydrocarbon oil component is substantially free of the volatile phosphorus contaminants.

2. The process as in claim 1 wherein the time is sufficient to effect greater than 99% volatile phosphorus decontamination after step c).

3. The process as in claim 1 wherein the acid activated clay is a fine powder having an average particle size between 10-50 μm.

4. The process as in claim 1 wherein the acid activated clay is any one of or a combination of montmorilinite, bentonite and attapulgite clay.

5. The process as in claim 1 wherein the acid activated clay is added to the hydrocarbon oil and clay slurry at a concentration of 1-5% by weight.

6. The process as in claim 5 wherein the acid activated clay is added to the hydrocarbon oil and clay slurry at a concentration of 2-3% by weight.

7. The process as in claim 1 wherein the hydrocarbon oil and clay slurry is mixed for a time sufficient such that the volatile phosphorus content is less than 0.5 ppm in the hydrocarbon oil component.

8. A process for treating a recovered fracturing fluid, the fracturing fluid comprising hydrocarbon oil contaminated with volatile phosphorus from the fracturing process, comprising the steps of:
   a) dewatering the recovered fracturing fluid;
   b) mixing the recovered fracturing fluid from step a) with acid activated clay for a time sufficient to effect volatile phosphorus removal from the hydrocarbon oil;
   c) separating the recovered fracturing fluid from the acid activated clay of step b) to form a separated clay containing phosphorus compounds and a hydrocarbon oil component wherein the hydrocarbon oil component is substantially free of the volatile phosphorus contaminants and wherein the separation of volatile phosphorus contaminants from the hydrocarbon oil occurs within a hydrocarbon phase;
   d) mixing the recovered fracturing fluid from step c) with acid activated clay for a time sufficient to effect volatile phosphorus removal from the hydrocarbon oil; and
   e) separating the recovered fracturing fluid from the acid activated clay of step d) to form a second separated clay containing phosphorus compounds and a second hydrocarbon oil component wherein the second hydrocarbon oil component is substantially free of the volatile phosphorus contaminants and wherein the separation of the volatile phosphorus contaminants from the second hydrocarbon oil component occurs within a hydrocarbon phase.

9. The process as in claim 8 wherein the time is sufficient to effect greater than 99% volatile phosphorus decontamination after step c).

10. The process as in claim 8 wherein the acid activated clay is a fine powder having an average particle size between 10-50 μm.

11. The process as in claim 8 wherein the acid activated clay is any one of or a combination of montmorilinite, bentonite and attapulgite clay.

12. The process as in claim 8 wherein the acid activated clay is added to the hydrocarbon oil and clay slurry at a concentration of 1-5% by weight.

13. The process as in claim 12 wherein the acid activated clay is added to the hydrocarbon oil and clay slurry at a concentration of 2-3% by weight.

14. The process as in claim 8 wherein the hydrocarbon oil and clay slurry is mixed for a time sufficient such that the volatile phosphorus content is less than 0.5 ppm in the hydrocarbon oil component.

15. The process as in claim 1 wherein prior to step a) the hydrocarbon oil is subjected to a dewatering process.

16. The process as in claim 1 wherein steps a)-c) are conducted at a temperature between room temperature and 68° C.

17. The process as in claim 8 wherein steps b)-d) are conducted at a temperature between room temperature and 68° C.

18. The process as in claim 1 wherein the volatile phosphorus contaminants are defined as the phosphorus found in the oil fraction removed by a single plate ASTM D86 distillation.

19. A process for treating a recovered fracturing fluid, the fracturing fluid comprising hydrocarbon oil contaminated with volatile phosphorus from the fracturing process, comprising the steps of:
   a) dewatering the recovered fracturing fluid; and
   b) passing the recovered fracturing fluid from step a) through a tower or packed filter containing beads of acid activated clay for a time sufficient to effect volatile phosphorus removal from the hydrocarbon oil and wherein recovered fracturing fluid from the tower or packed filter is substantially free of the volatile phosphorus contaminants and wherein the separation of the volatile phosphorus contaminants from the hydrocarbon oil occurs within a hydrocarbon phase.

20. A process for treating a hydrocarbon oil contaminated with volatile phosphorus contaminants from a fracturing operation, the volatile phosphorus contaminants being defined as the phosphorus found in the oil fraction removed by a single plate ASTM D86 distillation, comprising the steps of:
   a) adding acid activated clay to the hydrocarbon oil to create a hydrocarbon oil and clay slurry;
   b) mixing the hydrocarbon oil and clay slurry for a time sufficient to effect volatile phosphorus removal from the hydrocarbon oil; and
   c) separating the hydrocarbon oil and clay slurry to form a separated clay containing phosphorus compounds and a hydrocarbon oil component wherein the hydrocarbon oil component is substantially free of the volatile phosphorus contaminants and wherein the separation of the volatile phosphorus contaminants from the hydrocarbon oil occurs within a hydrocarbon phase.

21. The process as in claim 20 wherein the time is sufficient to effect greater than 99% volatile phosphorous decontamination after step c).

22. The process as in claim 20 wherein the acid activated clay is a fine powder having an average particle size between 10 and 50 μm.

23. The process as in claim 20 wherein the acid activated clay is any one of or a combination of montmorilinite, bentonite and attapulgite clay.

24. The process as in claim 20 wherein the acid activated clay is added to the hydrocarbon oil and clay slurry at a concentration of 1-5% by weight.

25. The process as in claim 20 wherein steps a) to c) are conducted at a temperature between room temperature and 68° C.

* * * * *